United States Patent Office 2,852,561
Patented Sept. 16, 1958

2,852,561

PROCESS FOR THE PREPARATION OF CYCLOHEXANONE OXIME

Josef Heinrich Fritz Pieper, Berlin-Lichterfelde-West, and Johanna Elisabeth Viktoria Natalie Stauch, Berlin-Schlachtensee, Germany, assignors, by mesne assignments, to Hercules Powder Company, Wilmington, Del., a corporation of Delaware No Drawing. Application March 21, 1956
Serial No. 572,829

Claims priority, application Germany March 22, 1955

6 Claims. (Cl. 260—566)

This invention relates to the preparation of cyclohexanone oxime and more particularly to the preparation of cyclohexanone oxime by rearrangement of bis-nitrosocyclohexane.

In our copending application, Serial No. 501,447, filed April 14, 1955, now U. S. Patent No. 2,805,253 there is described a process of preparing cyclohexanone oxime by rearrangement of bis-nitrosocyclohexane which is obtained in pure, stable form in accordance with the process set forth in our copending application, Serial No. 501,446, filed April 14, 1955. The rearrangement is conducted in a solvent or in the melt. In both cases there is a rearrangement, as indicated by the blue-green color of the reaction solution or melt which, upon further heating, disappears. With the use of a solvent the material is heated for a long time with refluxing until isomerization occurs. The boiling point of the solvent is important in connection with the conversion rate. The conversion rate increases with diminishing boiling point of the solvent. With low-boiling solvents there finally is such a lag that no further rearrangement takes place during any practicable time. The use of high-boiling solvents with a melting point above that of bis-nitrosocyclohexane (117° C.) is disadvantageous, inasmuch as it is often very difficult completely to separate the solvent from the reaction product.

It has now been found that bis-nitrosocyclohexane may be relatively rapidly rearranged into cyclohexanone oxime by heat-treating a solution of bis-nitrosocyclohexane in the presence of an alkaline agent to maintain the solution alkaline throughout the heat-treatment and rearrangement. Under these conditions a rearrangement takes place within a practicable time even below the boiling point of the solvent. Moreover, the use of low-boiling solvents which are otherwise out of the question for rearrangement is possible. Any organic and inorganic compounds which give an alkaline reaction with the reaction liquid may be used as alkaline agents. The solubility of the bis-nitrosocyclohexane and of the alkaline additives in the solvent used for the rearrangement affect the conversion rate. Furthermore, in accordance with this invention, it has been found that the rearrangement takes place in an alkaline melt solution as well as the alkaline solvent solution.

The following examples serve to illustrate the invention.

Example 1

An aqueous solution of bis-nitrosocyclohexane which has been saturated at the boiling point is adjusted to a pH of 10 with alkali hydroxide and then boiled, with refluxing, for 30 minutes. After the reaction solution has been cooled, it is exhaustively extracted with ether and the ether solution is separated from the aqueous solution. The ether contains 95% cyclohexanone oxime referred to the used bis-nitrosocyclohexane. After evaporating the ether, the cyclohexanone oxime precipitates and has a melting point of 88° C.

Example 2

Twenty parts ethanol, 2 parts bis-nitrosocyclohexane, and 0.2 part alkali hydroxide are boiled, with refluxing, for 10 minutes after which the solvent is distilled to ⅓ its initial volume. The residue is taken up with water and neutralized with sulfuric acid. By extracting the neutral solution with ether or chloroform, practically all of the cyclohexanone oxime is dissolved in the solvent. After evaporating the solvent, a cyclohexanone oxime of pure melting point precipitates. The yield is 96% referred to used bis-nitrosocyclohexane.

Example 3

Twenty parts chloroform is heated with 2 parts bis-nitrosocyclohexane and 1 part cyclohexylamine for 2 hours at the boiling point, under refluxing. The chloroform is then distilled, and the residue taken up with water and neutralized with sulfuric acid. The cyclohexanone oxime is obtained from this solution by extraction with ether. The ether extract contains 89% cyclohexanone oxime referred to used bis-nitrosocyclohexane. The solvent-free oxime melts at 88° C.

Example 4

A solution of 20 parts water, 2 parts cyclohexylamine, and 1 part bis-nitrosocyclohexane is subjected for 5 hours to a temperature of at least 50° C. When the reaction is complete, the solution is treated with sodium sulfate so that there will be no over-saturation at 0° C. At this temperature white needlelike crystals separate from the reaction solution, even after a short time. The crystals are filtered from the solution. They contain water and melt at 30–32° C. The crystalline cyclohexylamine-cyclohexanone oxime addition compound is split with sulfuric acid. The reaction solution should be neutral. It is taken up with 10 parts chloroform. The sulfuric acid-cyclohexylamine salt is insoluble in chloroform and is filtered off. The filtered chloroform solution contains 85% cyclohexanone oxime referred to used bis-nitrosocyclohexane. After evaporation of the chloroform, a cyclohexanone oxime of pure melting point is obtained.

Example 5

One part caprolactam is melted with 1 part bis-nitrosocyclohexane in a current of ammonia. The melt is maintained at 90–95° C. for 15 minutes. After cooling, the mixture is dissolved in hot water and fractionated by steam distillation. The yield of cyclohexanone oxime is 70% referred to used bis-nitrosocyclohexane. The resulting cyclohexanone oxime melts at 88° C.

As the above examples illustrate, the rearrangement takes place at a satisfactory rate in solvent solution at a temperature of at least 50° C. Water, ethanol and chloroform have been used as solvents and alkali hydroxide, cyclohexylamine and ammonia have been used as alkaline agents. Moreover, it will be noted that the rearrangement also takes place in melt solution where, for example, melted caprolactam serves as the solvent for bis-nitrosocyclohexane and ammonia as the alkaline agent. In melt solution the rearrangement takes place at a temperature of at least 90° C.

It will be seen therefore, that this invention may be carried out by the use of various modifications and changes without departing from its spirit and scope.

The term "parts" as used herein refers to parts by weight.

The cyclohexanone oxime of high purity obtained in accordance with this invention is suitable for direct preparation of ε-aminocaprolactam.

This application is a continuation-in-part of our copending application, Serial No. 501,447, filed April 14, 1955.

What we claim and desire to protect by Letters Patent is:

1. In the process of preparing cyclohexanone oxime by rearranging bis-nitrosocyclohexane obtained by oxidation of cyclohexylhydroxylamine, the improvement comprising heat-treating a solution of bis-nitrosocyclohexane dissolved in a solvent therefore in the presence of an alkaline agent to maintain the solution alkaline throughout the heat-treatment and rearrangement, said heat-treatment being carried out at a temperature of at least 50° C.

2. In the process of preparing cyclohexanone oxime by rearranging bis-nitrosocyclohexane obtained by oxidation of cyclohexylhydroxylamine, the improvement comprising heat-treating bis-nitrosocyclohexane dissolved in water in the presence of alkali hydroxide to maintain the solution alkaline throughout the heat-treatment and rearrangement, said heat-treatment being carried out at a temperature of at least 50° C.

3. In the process of preparing cyclohexanone oxime by rearranging bis-nitrosocyclohexane obtained by oxidation of cyclohexylhydroxylamine, the improvement comprising heat-treating bis-nitrosocyclohexane dissolved in ethanol in the presence of alkaline hydroxide to maintain the solution alkaline throughout the heat-treatment and rearrangement, said heat-treatment being carried out at a temperature of at least 50° C.

4. In the process of preparing cyclohexanone oxime by rearranging bis-nitrosocyclohexane obtained by oxidation of cyclohexylhydroxylamine, the improvement comprising heat-treating bis-nitrosocyclohexane dissolved in chloroform in the presence of cyclohexylamine to maintain the solution alkaline throughout the heat-treatment and rearrangement, said heat-treatment being carried out at a temperature of at least 50° C.

5. In the process of preparing cyclohexanone oxime by rearranging bis-nitrosocyclohexane obtained by oxidation of cyclohexylhydroxylamine, the improvement comprising heat-treating bis-nitrosocyclohexane dissolved in water in the presence of cyclohexylamine to maintain the solution alkaline throughout the heat-treatment and rearrangement, said heat-treatment being carried out at a temperature of at least 50° C.

6. In the process of preparing cyclohexanone oxime by rearranging bis-nitrosocyclohexane obtained by oxidation of cyclohexylhydroxylamine, the improvement comprising heat-treating bis-nitrosocyclohexane dissolved in melted caprolactam in the presence of ammonia to maintain the melt solution alkaline throughout the heat-treatment and rearrangement, said heat-treatment being carried out at a temperature of at least 90° C.

References Cited in the file of this patent

Okamura et al., 47 C. A., 2992 (1953).